F. W. GRISINGHER.
TRACTION DEVICE FOR WHEELS.
APPLICATION FILED MAR. 18, 1913.
1,114,983.
Patented Oct. 27, 1914.
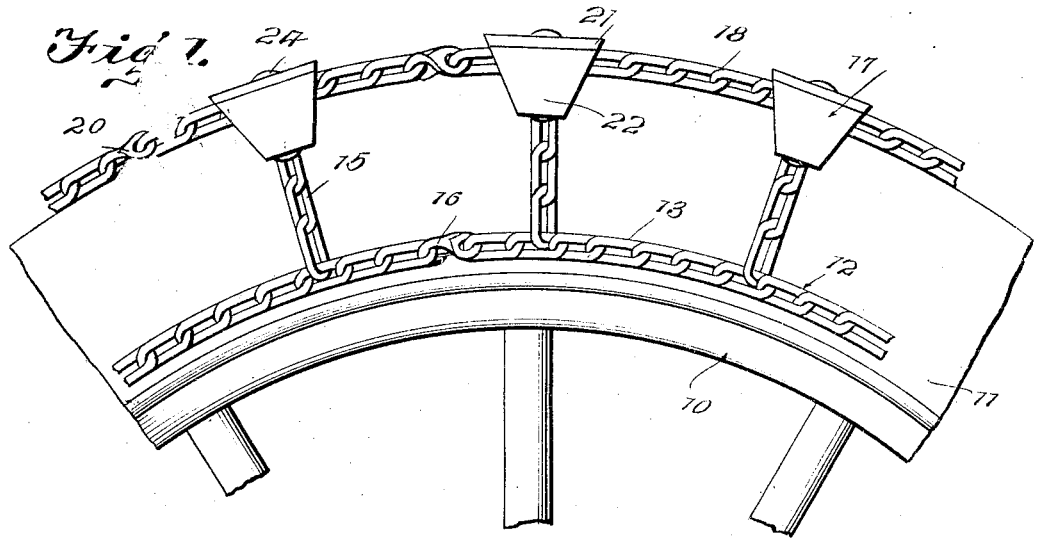
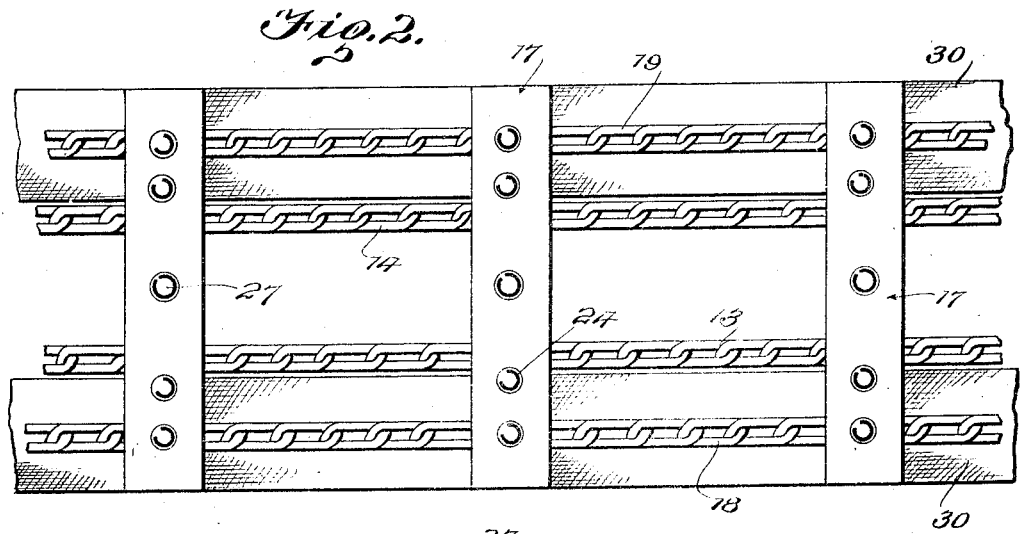
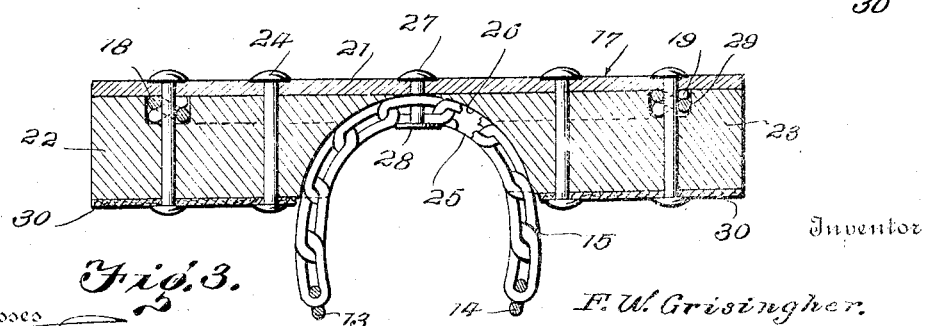
Inventor
F. W. Grisingher.
By
Attorneys.

UNITED STATES PATENT OFFICE.

FRANK W. GRISINGHER, OF GUADALUPE, CALIFORNIA.

TRACTION DEVICE FOR WHEELS.

1,114,983.  Specification of Letters Patent.  Patented Oct. 27, 1914.

Application filed March 18, 1913. Serial No. 755,179.

*To all whom it may concern:*

Be it known that I, FRANK W. GRISINGHER, citizen of the United States, residing at Guadalupe, in the county of Santa Barbara and State of California, have invented certain new and useful Improvements in Traction Devices for Wheels, of which the following is a specification.

My invention relates to new and useful improvements in separable traction devices for wheels and more particularly for the drive wheels of self-propelled vehicles and the object of my invention is to provide a chain adapted to be fitted about the tire or tread of the wheel in the manner in which non-skid chains are usually employed and provided with a plurality of peripherally spaced apart tractor bars.

A further object of my invention is to so construct and arrange these tractor bars as to render them particularly effective in passing through sandy or extremely muddy soil, while at the same time they will not in any way interfere with the running of the vehicle over a good road and will not be detrimental to the tires when the vehicle is upon a good road.

A further object of my invention is to provide means for maintaining the tractor bars in proper parallel spaced relation to each other, irrespective of the strains to which they are subjected. And a still further object of my invention is to so arrange the entire device that it may be readily removed from the wheel and packed in comparatively small space when not in use.

With these and other objects in view, my invention will be more fully described, illustrated in the accompanying drawing, and then specifically pointed out in the claims which are attached to and form a part of this application.

In the drawing: Figure 1 is a fragmentary elevational view of a conventional form of automobile wheel of the pneumatic tire type, showing my improved tractor device in use; Fig. 2 is a fragmentary top plan view of the device removed from the wheel; Fig. 3 is a sectional view on the line 3—3 of Fig. 2, parts being broken away to more clearly show the construction.

Corresponding and like parts are referred to in the following description and indicated in all the views of the drawing by the same reference characters.

In order to insure a clear and complete understanding of the construction and operation of my device I have illustrated the same as applied to a conventional form of automobile wheel, indicated as a whole by the numeral 10 and having a pneumatic tire of any preferred type 11.

In its simplest form the device consists primarily of a non-skid chain structure, indicated as a whole by the numeral 12 and including spaced side chains 13 and 14 connected at intervals by parallel spaced apart transverse chains 15, the side chains being provided each at one end with a hook or other device 16 by means of which the ends of each chain may be connected together to bind the chains 15 across the outer face of the tire as clearly shown in the drawing and as is customary with non-skid chain devices. Attached to each of the connecting chains 15, is a tractor bar, indicated as a whole by the numeral 17 and the end portions of these bars are held in proper spaced relation to each other when in use, by additional chains 18 and 19, one end of each of which is provided with a hook or other fastening device 20 corresponding to the fastening device 16 of the chains 13 and 14.

More specifically each of the tractor bars 17 includes a rectangular shaped plate 21 of metal, preferably steel and of sufficient thickness to withstand the strains to which it will be subjected and body portions or blocks 22 and 23 firmly secured to the end portions of the plate 21 by rivets or bolts 24. The outer faces of these blocks 22 and 23 are equal in width to the width of the inner faces of the plates 21 and said blocks are preferably trapezoidal in cross section with their non parallel faces inclined toward each other at equal angles from the outer or wider base to the inner or narrower base.

The inner end portions of the blocks are cut-away to form arcuate faces or surfaces 25 for smooth engagement against the outer face of the tire or tread upon which the device is to be employed and said faces 25 are in turn grooved as shown at 26 to receive the connecting chains 15 to which the bars as a whole are connected by rivets or bolts 27, the inner ends or heads of which are enlarged and flattened as shown at 28 to prevent injury to the tire. Because of this construction, the tire is subject to even less wear with this form of traction device than with the ordinary non-skid chain as the entire inner faces of the blocks bear smoothly and evenly against the tire.

The outer faces of the blocks 22 and 23 adjacent their outer ends are grooved transversely as at 29 to receive the chains 18 and 19 which are thus passed between the blocks and the plate 21 and which are secured in place and against longitudinal movement through the grooves by the outermost of the bolts 24 employed in connecting the blocks to the plates. These blocks are preferably formed of wood in order to render the entire device as light as possible although if preferred they may be formed of metal or any other material found suited for the purpose. Any number of tractor bars may be employed and said bars may be spaced apart any desired distance. It will however, be found that as a general rule there need not be as many tractor bars as there usually are cross chains in a non-skid device of the chain grip type.

In operation, the device is applied to the wheel of the vehicle in the same manner in which the ordinary chain device is employed, the auxiliary chains 18 and 19 being connected at their ends by the hooks 20 in the same manner in which the chains 13 and 14 are fastened. It will be apparent that these chains 18 and 19 not only serve, because of the rivets or bolts 24, to keep the bars in proper spaced apart parallel position, but also serve to maintain all of the bars in positions parallel to the axle and consequently in such position as to engage flatly against the ground.

Although this device may be employed upon good roads it is not recommended for that purpose as it does not possess any marked advantages as a non-skid device and is intended solely for use when traveling over roads which are ordinarily difficult or almost impassable, due to sand or deep mud. In such roads the ordinary non-skid chain devices merely cut away the sand or mud and in effect cause the wheels to bite in deeper than they ordinarily would and if anything are hurtful in their action rather than beneficial. With the above described device, the result is entirely different for the tractor bars not only increase the bearing surface of the wheel and thus support it and prevent it sinking into the sand or mud to a certain extent, but also furnish an enlarged body which must be forced through the sand or mud if the wheel is to slip. The driving action is therefore greatly increased.

If the device is to be employed where the sand is extremely heavy, as at beaches or the like, the supporting power of the wheel may be greatly increased by strips of relatively heavy canvas 30 secured to the inner faces of the end blocks 22 and 23, one upon either side of the wheel.

From the foregoing description it will be apparent that I have provided an extremely efficient form of traction device for use with self-propelled vehicles. It will, however, be understood that I do not wish to limit myself to the specific details of construction illustrated in the drawing and described in the specification as various changes, within the scope of the appended claims, may be made at any time, without in the slightest degree departing from the spirit of my invention. In other words, it will be understood that the tractor bars may be made in various sizes, lengths and cross sections, dependent upon the weight which they must support and the kind of roads over which the vehicle is to be driven. As few as possible of these bars will be employed in order that the device may take up as little room as possible in the vehicle when not in use and if employed on the front wheels the bars will be lighter and narrower than upon the rear wheels. I prefer to make these bars of wood because of the fact that they will be much lighter than if made of metal but I do not wish to limit myself to the use of wood. In order to insure sufficient strength, the strips of canvas may each consist of several thicknesses of canvas fastened together or each strip of canvas may be folded several times to obtain the same result. As all of these minor changes are dependent upon the weight of the vehicle and the character of the roads over which it is to pass no exact rules can be laid down governing the same.

Having thus described the invention, what is claimed as new is:

1. A device of the character described including a tire chain having side chains and cross chains connecting the side chains, and tractor bars each secured to one of the cross chains, each tractor bar including a plate, and blocks secured to the ends of the plate and having their inner ends cut-away to engage about the cross chains and to bear flatly against the tire, said blocks being secured to the inner face of the plate.

2. A device of the character described including a tire chain having side chains and cross chains connecting the side chains, tractor bars each secured to one of the cross chains, each tractor bar including a plate, and blocks secured to the ends of the plate and having their inner ends cut-away to engage about the cross chains and to bear flatly against the tire, said blocks being secured to the inner face of the plate, the outer faces of the blocks adjacent their outer ends being grooved, and peripherally extending chains passed through the grooves of the corresponding end blocks of the b    and held in place between said blocks and the plates by suitable fasteners.

3. In a device of the character described, a tire chain including side chains and spaced cross chains, tractor bars secured to the cross chains, a strip of canvas secured to the end portions of the tractor bars upon one side of the cross chains and a strip of canvas secured to the ends of the tractor bars upon the other side of the cross chains.

4. A device of the character described including a tire chain having side chains and cross chains connecting the side chains and tractor bars secured each to one of the cross chains, each tractor bar including a plate and blocks secured to the ends of the plate and having their inner ends cut-away to engage about the cross chains and to bear flatly against the tire, said blocks being secured to the inner faces of the plates, peripherally extending chains connecting the corresponding end blocks of the bars and holding the tractor bars against swinging movement, and peripherally extending strips of canvas secured to the inner faces of the corresponding blocks.

5. In a device of the character described, a tire chain including side chains and spaced cross chains, the side chains being adapted to bear against the side of the tire adjacent its locking beads while the cross chains engage transversely about the periphery of the tire, tractor bars secured to the cross chains and extending at their ends beyond the sides of the tire, and chains connecting corresponding ends of the tractor bars.

In testimony whereof I affix my signature in presence of two witnesses.

FRANK W. GRISINGHER. [L. S.]

Witnesses:
P. GIACOMINI,
W. TOGNAZZINI.

---

Copies of this patent may be obtained for five cents each, by addressing the "Commissioner of Patents, Washington, D. C."